W. W. COOPER.
Cask Gage.
No. 50,689.
2 Sheets—Sheet 1.
Patented Oct. 31, 1865.
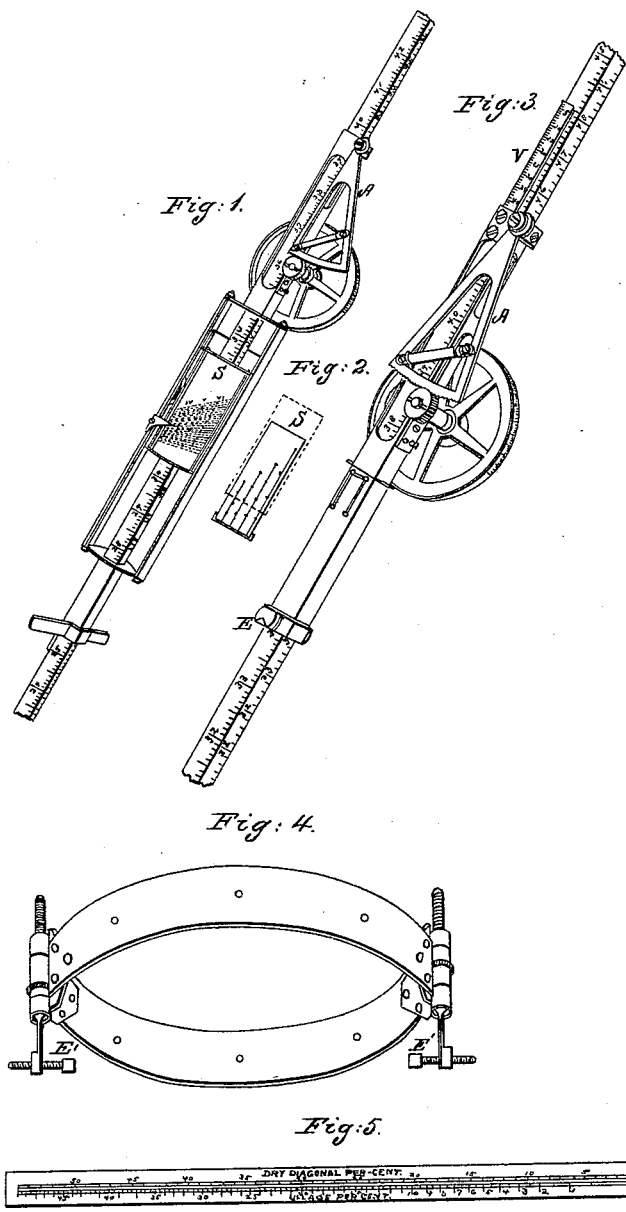
Witnesses:
Inventor:

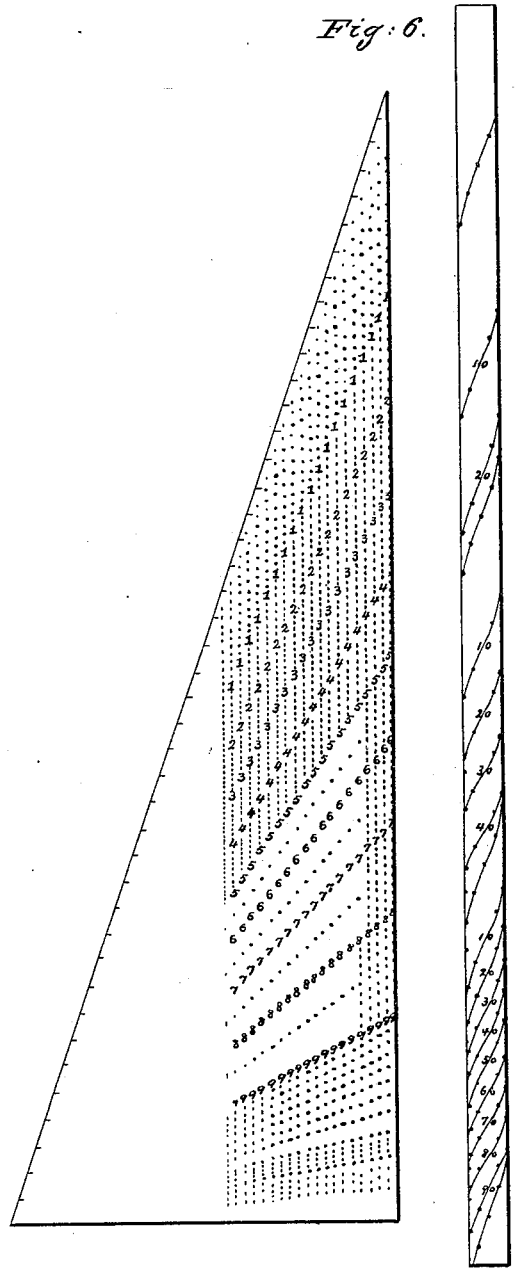

UNITED STATES PATENT OFFICE.

WILLIAM W. COOPER, OF WASHINGTON, DISTRICT OF COLUMBIA.

IMPROVEMENT IN GAGING AND ULLAGING CASKS.

Specification forming part of Letters Patent No. 50,689, dated October 31, 1865.

*To all whom it may concern:*

Be it known that I, WILLIAM W. COOPER, of Washington city, in the District of Columbia, have invented a new and useful gaging-instrument and methods for determining the capacity and dimensions of casks, barrels, and cylinders varying both in form and size, of which instrument and methods the following is a full description.

My system of gaging consists in deriving the capacity of a cask from one or more diagonal measures, combined with the angles that such diagonals make with the middle diameter, and in referring the capacities of casks of various shapes to a scale graduated for a model shape by means of the derivation of those angles from the corresponding angles in the model cask.

The instrument which I have invented to be used according to said system consists of three principal parts, namely: a straight graduated rod of four faces, an angular sector, and a small supplementary or sliding scale attached to the same, the two implements being so constructed as to move freely up or down on the rod. Two opposite faces of the rod are graduated in inches and parts. Another face is graduated to show the diagonal length of each "maximum cylinder," ranging in contents from one gallon to one hundred and seventy-five gallons or more. The fourth face of the rod is graduated and marked for the length of sines or co-sines of the angle of forty-five degrees, corresponding to the inch-graduation of the first two faces, considering as radius the diagonal rod itself.

One of the two implements, (the sector,) when anywhere on the rod, measures the various angles at which the rod may be inclined from the perpendicular. It is adapted to the measure of portions of arc as small as six minutes, and is made as light as possible, of brass or aluminium. To that end a portion of arc is cut away in construction, and a small level is so attached to the sector that about twenty-three degrees of inclination from the perpendicular may be reckoned as zero. The next portion of arc, or twenty-five degrees, (going to forty-eight degrees of inclination,) is divided into one hundred parts, to correspond with successive increments of one-twentieth of an inch above a diagonal length of fifty inches in the maximum cylinder, the inclination of the rod in that cylinder being thirty-five degrees, fifteen minutes, fifty-two seconds from the perpendicular, and the diagonals so increased corresponding to cylinders exactly equal in capacity to the maximum cylinder, of which the diagonal is fifty inches. With the extremes of the angles of inclination, (twenty-three degrees and forty-eight degrees,) the diagonals of the equivalents are fifty-two inches and a half in length. In this description the cylinders are supposed to lie with their circular ends at right angles to a level floor or pavement.

The second implement is a tubular sliding scale two and a half inches long, either of metal, wood, gutta-percha, or card-paper, through which the gaging-rod passes, and which is held in a light metal frame, so as to admit of free motion up or down, and also of revolving motion around the rod as its axis. Scale-lines are marked on the outside of the tube, to show the excess in the diagonal lengths before mentioned. The lines, fifty in number, are drawn parallel to the axis of the tube, and from a point which corresponds to the angle of the maximum cylinder they rise by successive twentieths of an inch to the height of two inches and a half, and thus determine the proper length of the tube. The scale-lines are adapted to a set of fifty angles above and fifty angles below the inclination which the gaging-rod takes in the maximum cylinder.

The relation between the scale-lines and the angles will be readily understood by persons versed in mathematical computations, as can also the relation of the maximum cylinder to cylinders of any other form. To such the use of the sliding-scale will be obvious. It serves by a downward motion to reduce the diagonals of cylinders other than the maximum to the true diagonal length of the equivalent maximum cylinder, and consequently renders the capacity of all cylinders by the graduation in gallons on the rod, the graduation being for the form of the maximum.

Each line on the tubular scale corresponds to a particular inclination of the diagonal rod, and is marked for that particular inclination. The line of two and a half inches being marked for the greatest and least inclination of a diagonal of fifty-two and a half inches, the proper reduction for cylinders of such forms is made by moving the tube down two and a half inches when the diagonal is fifty-two and a half, and proportional parts of two and a half inches when the diagonal is less than fifty-two and a half inches.

Each of the lines on the scale is divided into twenty-six and a half equal parts, one of the whole parts, read on either line, corresponding with two inches of diagonal length. The use of this sliding-scale dispenses with all computation in practical gaging, the capacity being read on the rod by a pointer fixed at the top of the tube. The relations of the parts of the instrument, however, are such that, if resort be had to a simple multiplication of the number which marks any angle on the sector by the number which marks the diagonal length, the product shows in divisions, each of about a twentieth of an inch, the proper reduction to be made in the diagonal to find true content, and that reduction may be read on a downward graduation, made either on the rod-sheath or on a slip of metal attached to the upper part of the sheath which carries the first-described implement or sector. In so doing the sliding-scale and the frame which carries it may be dispensed with in gaging.

The use of the sliding-scale in tubular form is to dispense with the necessity of making any computation whatever.

The inclination of the rod when forty-five degrees from the perpendicular is found by means of the level before mentioned and a standard-mark on the sector, and in using them the rod may be held at pleasure at an inclination of forty-five degrees. So held in a cask, cylinder, or in any vessel having parallel ends, with the lower extremity of the rod touching one end of the vessel, the true interior length of the cask, cylinder, or whatever vessel of symmetrical form it may be, is read on the line of sines or co-sines marked on one face of the rod. In like manner the bung-diameter or any oblique measure of the inside of the cask or cylinder may be found.

For convenience in reading the graduations on the diagonal rod, all begin ten inches above their normal place, or less, according to the length of the sheath which carries the sector and sliding-scale in either of its two forms here described, and those for content in gallons, and for the sines or co-sines of forty-five degrees are marked with double their normal value, the term "diagonal" used in this description being understood in its literal acceptation. It will now be applied according to its ordinary meaning when mentioned in reference to the gaging of casks.

To apply my gaging-instrument for determining the capacity of a cask or barrel, the rod is inserted at the bung, and applied so as to read the diagonal measure at a point ten inches above the bung. The tubular sliding-scale and sector being on the rod, the angle of inclination is read on the sector, and a line on the sliding-scale having the same mark as the angle is found. On that line a reading is found identical with the diagonal reading, and the tubular scale is drawn down until a fixed point on the frame of the scale coincides with the reading on the tube. The reading of capacity, which then stands at a brass pointer going from the top of the tube, is either mentally reserved or written down with chalk. It is, in fact, the content of a cylinder of which the diagonal is the same as the diagonal of the cask in hand, and that content is so marked that the sixth part of it may be read on the face of the rod which carries the graduation for capacity. The reading in sixths is the one to be reserved. By a subsidiary graduation on the sector, resulting from experiment with the curvature of casks of various forms, and which graduation is marked exactly like the primary one, angle for angle, a second inclination is given to the rod, always less than the first inclination, and the lower end of the rod is allowed to touch where it may, so that with the rod at rest in the cask the reading on the subsidiary graduation of the sector may be identical with the reading found on the primary graduation. The diagonal is again read, the sliding-scale applied, and a reading for content found as before, which reading, added to the reserved sixth found by the first reading, gives the capacity of the cask.

The subsidiary graduation on the sector is intended to give the lower end of the diagonal rod a position short of its first position at the chine by one-sixth of the interior length of the cask. In gaging cylinders by my instrument, however the forms of the cylinders may vary, their true capacities will be found in the first reading and with a single position of the rod.

To make the adjustment necessary for correct measuring at the bung, a detached instrument is used, consisting of a firm spring made of steel wire, bent so as to act laterally and also vertically upward. Two loops on the spring carry two metal thongs, the lower ends of which are furnished with screws inserted transversely, and of such length that when brought together they will pass into the smallest bung. A small part of the length at the inner end of each screw is drawn into opposite knife-edges, two on each screw. The thongs being passed in at the bung so as to carry the transverse screws fairly into the cask, the hand is taken from the apparatus, and the spring, arching both upward and laterally, brings the screws firmly to the under side of the stave and opposite to each other in the diameter of the bung, which is at right angles to the length of the cask. The screws admit of such adjustment to either large or small bungs that transverse grooves on the lower part of the sheath which carries the sector or sliding-scale may catch on the knife-edges before mentioned, and thus enable the gager with free hand to find the second position for the diagonal rod. The spring admits of being made in many forms.

The adjunct fixture used in my practice is shown in Fig. 4 of the drawings. It consists of a pair of elliptic springs made of steel band about an inch in width. These are joined at their ends by a pair of brass hinges, the spindles of which are cut in screw-thread and prolonged below the hinge itself. Through the lower part of each prolongation passes at right angles a small screw, as seen in the figure. By a nut or lifter confined in the tube of each hinge the transverse screws can be adjusted to any thickness of stave.

The necessity of the implement for nice angular measurements in gaging and its mode of application in large or small bungs are obvious.

The accompanying drawings show a portion of the gaging-rod with the two implements on it and the modified form of the apparatus for referring the measurements to the proper place in the bung in gaging casks. The spring seen in the view is a steel hoop cut in two and joined by strong brass hinges. It holds in the bung by lateral pressure alone; but the upright screws admit of binding the hoop tight on the top of the cask when the thongs are in the bung.

In addition to the processes already described for determining the capacity of casks, I also apply the following, using the same principles—namely, angular measurement and the properties and relations of the maximum cylinder, combined with a property of the conchoid of Nicomedes, and thereby find the capacity of a cask by one position of the gaging-instrument. For that purpose a second tubular sliding-scale (shown in Fig. 2 of the drawings) is made to move within the tubular scale before described, like the eye-piece of a telescope, but with more freedom of motion. The inner tube is furnished below with a slight flange, turning outward, so that in drawing down the outside tube, as in the process of gaging first described, the inner tube is carried down with it. The pointer on the outer tube rendering the capacity of a cylinder having the same diagonal as the cask, and that capacity, by its mathematical relations, being always less than the capacity of any form of cask, from that of the double truncated cone to that of the double conchoid of Nicomedes, lines are inscribed on the outer surface of the inner tube to correspond to differences in capacity between the maximum cylinder and the solid conchoid of the same proportions, but of different degrees of swell or curvature when both are of the same diagonal length. Finding, therefore, the cylindrical capacity, as first described, by moving down the sliding-scale, that scale or outer tube is again drawn up until its lower edge coincides with the proper line of the inner tube. The pointer, having thus gone up, will stand opposite to an increased cylindrical capacity equivalent to the conchoidal capacity sought, and will thus render by a single reading on the diagonal rod the content of the cask. The inner tube is two inches and a half in length, and is so made that when carried downward by the outer tube it will retain its place in the frame and permit the outer tube to be drawn up to the requisite line.

The species of conchoid which any cask may represent is expressed by a vulgar fraction, of which the numerator is the bung-swell of the cask and the denominator the same swell plus the difference between the diagonal and bung diameter of the cask. The swell at the bung, as will be readily understood by those versed in mathematics, is the difference between the bung-diameter and the co-sine of the angle between the diameter and the diagonal of the cask, the diagonal being taken as radius. It may therefore be computed directly or determined for any given angle by a sliding-scale made to refer to a standard angle; or it may be measured on the outside of the cask, or according to the present practice in gaging. The lines on the inner tube being marked each with its proper fraction, it is necessary merely to compute the fraction for any cask in hand and apply the scale accordingly. For convenience, the fractions in all cases are to be expressed in decimals.

The principle here described will always hold, not being restricted to any particular curvature. If in general practice it should be found that the conchoidal curve is too much bent, only the distance-lines on the inner tube, but not the relation of the fractions to them, would require change, the computations being made, if necessary, for a parabolic figure somewhat less in curvature than the conchoid.

The application for angular measurement giving ready command of the effect of different inclinations of the diagonal rod, I propose, moreover, to apply the rod in two other ways for determining the capacity of casks by a single reading of the graduation in gallons. As one of these methods, I merely add five per cent. to the cylindrical capacity found at the first position of the rod. For the other method I use a rod graduated in gallons for a cask of average swell and curvature, and on which rod or on one face of the rod used also for the other methods, the mark for two wine-gallons stands at 9.0329 inches. By the same graduation the mark for one hundred gallons stands at 33.27 inches, while the same capacity by the cylindrical graduation calls for 33.68 inches. The model cask here referred to is, in fact, the maximum cylinder taken with an average swell and curvature.

In applying either of these two methods the diagonal at inclinations other than that found in the maximum cylinder is to be corrected by the means already pointed out. The results in gaging by these methods are true for all casks except such as may be unusually straight or excessively curved in the staves. The method before described is designed by using a second position of the rod, and so taking in a portion of the curvature of each cask, to meet the requisites of precision in the mathematical theory of gaging.

In addition to the finding of entire capacities, I have adapted the same instrument to the determination of the actual content of casks that may be only partly full, and use for that purpose a scale of two lines marked on the sector-sheath or on the ordinary logarithmic scale known as the "pocket sliding-rule." One of these lines represents fifty-five per cent. of the diagonal of a cask of average swell, and of such length that the diagonal rod would take in it the inclination peculiar to the diagonal of the maximum cylinder. The other line, (of exactly the same length,) divided into fifty unequal parts, represents hundredths of the capacity of the same cask. The graduation of both lines is referred to a point through which the axis of the cask would pass, fifty-five per cent. of diagonal from the bung corresponding to fifty per cent of content. That point for a diagonal of the greatest inclination shown by the sector of the gaging-instrument herein described will be at fifty-eight per cent. of the diagonal length, reckoning from the bung, and for a diagonal of the least inclination shown by the sector the intersecting point of the axis of the cask of average swell will be at fifty-three per cent. of the diagonal length from the bung.

In determining "outage" or "wantage" by my system, the percentage of diagonal found dry at any angle (other than the standard thirty-five degrees, fifteen minutes, fifty-two seconds) is corrected by means of a reducing-fraction, which is marked on the sector at that angle. Each angle has its proper reducing-fraction, the diagonal inclination in the longest cask calling for a reduction of one-twentieth in the dry percentage of diagonal. The inclination in the shortest cask requires an increase of one-thirtieth in the dry percentage of diagonal. Above the standard angle (that of the diagonal of the maximum cylinder) all the reducing-fractions are marked "minus." Below it all are marked "plus;" and varying forms in respect of length are in that way reduced to the standard form, in accordance with my general system for gaging. The standard angle is marked "zero," and the angular graduation runs both ways from it on the sector, the two series of angles being marked in precisely the same way and distinguished by the letters A (meaning above the standard) and B, (meaning below the standard.)

The diagonal dry percentage found and corrected by the method here described shows on the scale of content before referred to the true per cent. of dry capacity in the cask, and consequently the percentage of content on ullage. The same system determines the wet ullage directly. If more than fifty-five per cent. of the diagonal should be found dry, the wet percentage is increased by ten and corrected by taking the reducing-fraction with a contrary sign. The true per cent. of wet content is then read on the scale. Any wet percentage of diagonal may be treated in the same way.

For convenience, the places of the reducing-fractions on the sector are so computed that the denominators may be decimal in character, the numerators being unity, as $\frac{1}{20}$th, $\frac{1}{30}$th, $\frac{1}{40}$th, and so on.

To perform the operation of division in finding the dry or wet percentage of diagonal, the well-known logarithmic sliding-rule of, say, six inches in length may be convenient. If such scale be resorted to in practice, the signs of the reducing-fractions may be disregarded by substituting for the unit of each numerator a number one unit less than the corresponding denominator of negative fractions and one unit more than the corresponding denominator for positive fractions, taking, in fact, nineteen-twentieths of diagonal percentage instead of deducting one-twentieth, or thirty-one thirtieths instead of adding one-thirtieth, by mental process.

In determining wet ullage with the logarithmic sliding-rule as an adjunct, the reducing-fractions are to be inverted, nineteen-twentieths in that case being read twenty-nineteenths of the wet percentage increased by ten, as before stated.

My system of gaging rests, essentially, on the reduction of any given diagonal as a whole to a standard diagonal. In the method now described for determining wantage or outage the same principles are employed to reduce to a standard only the part of the diagonal which is above the axis of the cask. Both processes depending upon the relation to a standard of the angle of inclination taken by the diagonal rod in any case, the entire subject will be readily understood by persons moderately-well versed in geometry and in mathematical inquiries.

The scale of two lines for the method of ullaging just described need not be more than six inches long. No change whatever is required to adapt the gaging-instrument for determining wantage by that method, the reducing-fractions which are marked in the construction being on the sector, each in the place to which it belongs by strict mathematical relation. I claim the development of this method of ullaging as an improvement, the fact being well known that by reason of very hard sediment in certain oils and molasses it is sometimes impossible to measure the bung-diameter with any tolerable degree of accuracy in a perpendicular direction.

By a second and preferable method, of which I also claim to be the sole inventor, the percentage of content wanting in a cask of any size and of any average form is found at once by simple inspection. To do this I expand, with all its subdivisions, the scale marked "ullage per cent." in the accompanying diagram, Fig. 5, to a length of twenty-two inches or more, and project it as the upper half of a perpendicular line drawn on a large sheet of paper. A hypotenuse is then traced to make with the perpendicular of, say, forty-four inches an angle of about eighteen degrees. The rightangled triangle being completed, its base is divided into any convenient number of parts—say such number that the perpendiculars drawn upward may differ in length by about a quarter of an inch. From the graduated divisions on the main perpendicular, which are dry ullage per cent. for the model cask, lines are then drawn to the lower acute angle of the triangle, and each one of the perpendiculars is marked for ullage per cent. exactly like the original scale. The paper drawing being thus made complete, all that part of the triangle which will not in its upright position wind spirally around a tube of brass or iron or other material, also held upright, and say an inch and a half in diameter, and of the exact height of the whole triangle, is cut away along a line parallel with the hypotenuse. The lower acute angle of the triangle may be cut away and rejected entirely as far as the perpendicular of eight inches, that being the diameter of the model cask of two gallons.

The graduation just described may be, at pleasure, extended so as to apply also to the lower half of the cask of any size, and the portions of the triangle so cut away applied spirally to other tubes, and thus the dry percentage of content may be read to any limit below as well as above the axis of the cask.

Each tube, while suitably fitted with a mandrel, is marked by steel dies with the figures found on the strip of paper that surrounds it spirally, the paper being held by paste or glue while the punches are in use. The lower end of the tube, corresponding exactly with the base of the paper triangle, is brought to a tolerably sharp edge, so that the tube may pass readily through any sediment of oil or of molasses, and thus find the lower stave opposite to the bung in measuring the ullage per cent. of the cask. By the spiral arrangement the scale is, in effect, expanded or contracted at pleasure, so as to be adapted to casks of any size whatever, from eight inches or less up to forty-four inches or more in bung-diameter. It will be readily understood that in practice the percentage out for the horizontal cask is read at the wet-mark of any line of which the upper end is exactly at the bung of the cask when the tube is held perpendicular with its lower end resting on the lowest stave of the cask, barrel, or keg.

If in any case the dry-reading falls below the lower extremity of the line which exactly reaches up to the bung, as it may in very large casks, recourse must be had to the second tube.

A short subsidiary table of per cents. for bung-diameter and outage, beginning with twenty-five cent. of outage and extending to fifty per cent., dispenses with the necessity of a second tube, even for large outage in the largest casks. In that case, however, the wet and dry measures of the bung-diameter must be taken with the gaging-rod, and the computed dry per cent. of diameter, when found in the little table, stands opposite to the percentage of capacity wanting in the cask. My scale for ullage, outage, or wantage, in its flat form, as shown in Fig. 6, needs no subsidiary table, the wet and dry measures being taken with the gaging-rod and applied to a line corresponding in length with the bung-diameter of the cask. The same scale marked on the outer surface of a tube, as seen in Fig. 6, shows by inspection the wantage down to fifty per cent. in a cask of one hundred gallons, and by help of the gaging-rod as a simple measure of the proportions of diameter, wet and dry, shows by inspection the percentage of liquid in the same when the cask is not half full. It reads to twenty-five per cent. of outage in a cask with a bung-diameter of forty-five inches. Multiplying the gaged capacity of the cask in gallons by the dry per centage found on the tube gives, of course, the number of gallons wanting to fill the cask.

What I claim as my invention, and desire to secure by Letters Patent, is—

1. An instrument, constructed substantially as herein described, for gaging or determining the capacities and interior dimensions of casks by the combined use of one or more diagonal angles with linear measures of the cask-diagonal.

2. In connection with the process of gaging, the invention, as herein described, of a scale adapted to casks of all sizes for ascertaining by inspection the percentage wanting in any given cask that may not be full—in particular the application of the said scale to the outer surface of a tube, in which case the scale, taking a spiral arrangement, may be applied inside of the cask.

3. As a necessary adjunct for the angular measurements peculiar to my system of cask-gaging, the invention of the implement described and shown for use in the bungs of casks.

W. W. COOPER.

Witnesses:
CHARLES WALTER,
JNO. M. McCALLA.